(12) United States Patent
Biggs et al.

(10) Patent No.: US 9,222,531 B2
(45) Date of Patent: Dec. 29, 2015

(54) VEHICLE TRANSMISSION WITH TIE-UP MONITORING LOGIC

(71) Applicant: GM GLOBAL TECHNOLOGY OPERATIONS LLC, Detroit, MI (US)

(72) Inventors: Scott D. Biggs, Milford, MI (US); Ronald F. Lochocki, Jr., Ypsilanti, MI (US); Moussa Ndiaye, Canton, MI (US); Patrick Alan Lewis, Howell, MI (US); Jeffrey Nicholas Trush, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 130 days.

(21) Appl. No.: 14/185,222

(22) Filed: Feb. 20, 2014

(65) Prior Publication Data
US 2015/0233432 A1    Aug. 20, 2015

(51) Int. Cl.
*G05D 1/00* (2006.01)
*F16D 48/06* (2006.01)

(52) U.S. Cl.
CPC .................... *F16D 48/062* (2013.01)

(58) Field of Classification Search
CPC .......................................... F16D 48/062
USPC .......................................... 701/67
See application file for complete search history.

(56) References Cited

U.S. PATENT DOCUMENTS

| | | | | |
|---|---|---|---|---|
| 5,711,409 A | * | 1/1998 | Murata | F16D 48/062 192/48.611 |
| 2005/0064991 A1 | * | 3/2005 | Benz | B60K 28/16 477/107 |
| 2006/0233432 A1 | * | 10/2006 | Ishida | G07D 11/0036 382/141 |
| 2014/0350810 A1 | * | 11/2014 | Pietron | F16H 61/061 701/67 |

* cited by examiner

*Primary Examiner* — David J Hlavka
(74) *Attorney, Agent, or Firm* — Quinn Law Group, PLLC

(57) ABSTRACT

A vehicle includes a prime mover, transmission, and controller. The transmission, e.g., a DCT or 8-speed automatic transmission, includes an input member, an output member, gear sets, and a plurality of clutches. The controller monitors the transmission for a threshold tie-up condition via a method, which includes processing clutch control input signals and a gearbox status signal to identify the clutches involved in a present operating mode of the transmission, e.g., a shift, neutral, or fixed gear. The controller determines the torque capacity of each involved clutch, compares the determined clutch torque capacities to respective calibrated clutch torque capacities, and executes a control action in response to a threshold tie-up condition. The threshold tie-up condition is present when the determined clutch torque capacities exceed the calibrated clutch torque capacity for at least one of the involved clutches for longer than a calibrated duration.

20 Claims, 3 Drawing Sheets

VEHICLE TRANSMISSION WITH TIE-UP MONITORING LOGIC

TECHNICAL FIELD

The present disclosure relates a vehicle having a transmission with tie-up monitoring logic.

BACKGROUND

A vehicle transmission transmits input torque from a prime mover such as an engine or an electric machine to a set of drive wheels through a range of output speeds. In a typical automatic transmission, a hydrodynamic torque converter or an input clutch couples an engine output shaft to a transmission input member. Such a transmission may include various planetary gear sets and hydraulically-actuated clutches, with the various nodes of the planetary gear sets interconnected to each other via the application of different combinations of the clutches. In contrast, a dual-clutch transmission (DCT) has two input clutches for selecting the respective oddly-numbered and evenly-numbered gear sets. In both the multi-speed and the DCT design, a transmission control module executes clutch shift logic to control the necessary clutch sequencing for achieving a requested shift between the different gear sets.

SUMMARY

A vehicle is disclosed herein that includes a transmission and a controller. The controller monitors the ongoing operation of the transmission for a possible threshold tie-up condition. As is known in the art, the term "tie-up condition" as it pertains to transmissions refers to any condition in which the transmission is simultaneously in two different gear states. Shift events in an automatic transmission are ordinarily tied-up to some extent for a transient period as clutch torque capacity is removed from an offgoing clutch and increased for an oncoming clutch. However, if the tie-up condition persists, or if the clutch torque capacities of the various involved clutches of a given shift or holding clutches in fixed gear state are at or above a calibrated threshold, the controller determines that the threshold tie-up condition exists. In response to such a determination, the controller may take any necessary control actions for protecting the transmission.

In other words, the controller of the present invention does not take action in the case of ordinary or expected tie-ups where the torque capacities of involved clutches for a present operating mode or shift of the transmission remain below their calibrated thresholds, or if the tie-up conditions resolve themselves within a calibrated duration. The calibrated thresholds may be determined offline and recorded in memory, e.g., in a lookup table. The thresholds may correspond to a maximum allowable vehicle acceleration, which as used herein means any resultant threshold level of sudden change in vehicle speed, whether positive (accelerating) or negative (decelerating), that could be perceived by a driver and adversely affect ride quality. The avoidance of such unintended acceleration events is an end goal of the present approach.

The control method disclosed herein is applicable to various transmission types. Two example transmissions include an 8-speed automatic transmission and a dual-clutch transmission (DCT), both of which are described in further detail below. As part of the disclosed control approach, and in general terms applicable to all embodiments, the controller determines the gear states that are being commanded on and off for a requested shift of the transmission, or a fixed gear state in a steady state evaluation, and sets fixed boundaries for the allowable torque capacities for these clutches. The specific parameters processed by the controller depend on the transmission type. If a tie-up condition is detected, and if such a condition lasts for longer than a calibrated duration, the controller concludes that a threshold tie-up condition is present and subsequently takes appropriate control actions, for instance by commanding a default operating mode providing a limited drive capability, disabling the ability to control solenoid valves of the transmission, disabling function of the transmission altogether, and/or setting a diagnostic fault.

In a particular embodiment, the vehicle includes a prime mover, a transmission, and a controller. The prime mover, such as an engine or motor generator unit, has an output shaft. The transmission includes an input member, an output member, a plurality of gear sets, and a plurality of clutches. The controller, which is in communication with the transmission, is programmed to monitor the transmission for a threshold tie-up condition. The processor executes instructions via a processor to thereby process a set of clutch control input signals and a gearbox status signal, and identify, from among the plurality of clutches, the clutches that are applied or otherwise involved in a present operating mode of the transmission, be that a fixed gear mode or a shift involving an oncoming and an offgoing clutch or multiple such clutches.

The controller also determines the clutch torque capacities of each of the involved clutches, compares the determined clutch torque capacities to a respective calibrated clutch torque capacity for each of the involved clutches, and executes a control action with respect to the transmission in response to a calibrated threshold tie-up condition of the transmission. The threshold tie-up condition is present when the determined clutch torque capacities exceed the calibrated clutch torque capacity for a predetermined number of involved clutches for longer than a calibrated duration. For a DCT, both input clutches must exceed their respective calibrated clutch torque capacities. For an 8-speed automatic transmission, if there are three clutches commanded on for a fixed gear mode or drive state, only one additional clutch must be above its calibrated clutch torque capacity for the calibrated duration for a threshold tie-up condition to be present.

The transmission may be alternatively configured as multi-speed automatic transmission, for instance an 8-speed transmission having four planetary gear sets, or as a DCT. In the 8-speed embodiment, the clutches may be braking or rotating clutches. In the DCT embodiment, the clutches are an odd and an even input clutch as explained herein.

An associated method of monitoring a transmission for a threshold tie-up condition includes receiving a set of clutch control input signals and a gearbox status signal, and identifying, from among a plurality of clutches of the transmission, a set of clutches involved in a achieving or maintaining a present operating mode of the transmission. The method also includes determining a current clutch torque capacity of each of the involved clutches and extracting, via the controller, a calibrated clutch torque capacity from a lookup table for each of the involved clutches. Thereafter, the method proceeds by comparing the determined clutch torque capacities to the respective calibrated clutch torque capacities for the involved clutches.

A control action is executed with respect to the transmission in response to a threshold tie-up of the transmission, including recording a diagnostic code and a default operating mode of the transmission via the controller. The threshold tie-up of the transmission in the method, as in the vehicle described above, is present when the determined clutch torque capacities exceed the calibrated clutch torque capacity for at least one of the involved clutches for longer than a calibrated duration.

The above features and advantages and other features and advantages of the present invention are readily apparent from the following detailed description of the best modes for carrying out the invention when taken in connection with the accompanying drawings.

DETAILED DESCRIPTION

Figure 1:
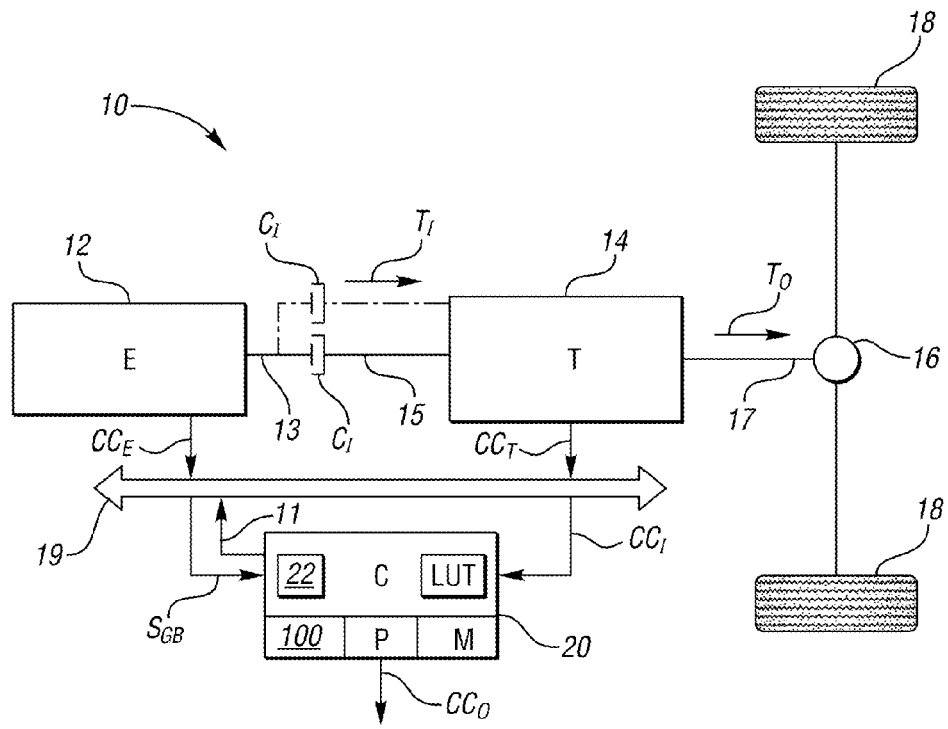
FIG. 1 is a schematic illustration of an example vehicle having a transmission and a controller that monitors the transmission for a threshold tie-up condition.

Referring to the drawings, wherein like reference numbers correspond to like or similar components throughout the several figures, a vehicle 10 is shown schematically in FIG. 1. The vehicle 10 includes a prime mover, shown here as an internal combustion engine (E) 12. Another example prime mover includes an electric machine, e.g., a motor/generator unit, which may be used in place of or in conjunction with the engine 12 of FIG. 1. The vehicle 10 also includes a transmission (T) 14 and a controller (C) 20. The controller 20 is configured, i.e., programmed in software and equipped in hardware, to execute a transmission tie-up monitoring method 100 which allows the controller 20 to determine, for instance via a set of calibrated lookup tables (LUT), when a threshold tie-up condition of the transmission 14 is present.

As used herein, a threshold tie-up condition is any transmission tie-up that above the limits of the lookup tables that persists for longer than a calibrated duration, e.g., as determined via a timer of the controller 20. All other tie-ups of the transmission 14 may be treated, as they ordinarily would be, via conventional transmission shift control logic.

Figure 2A:
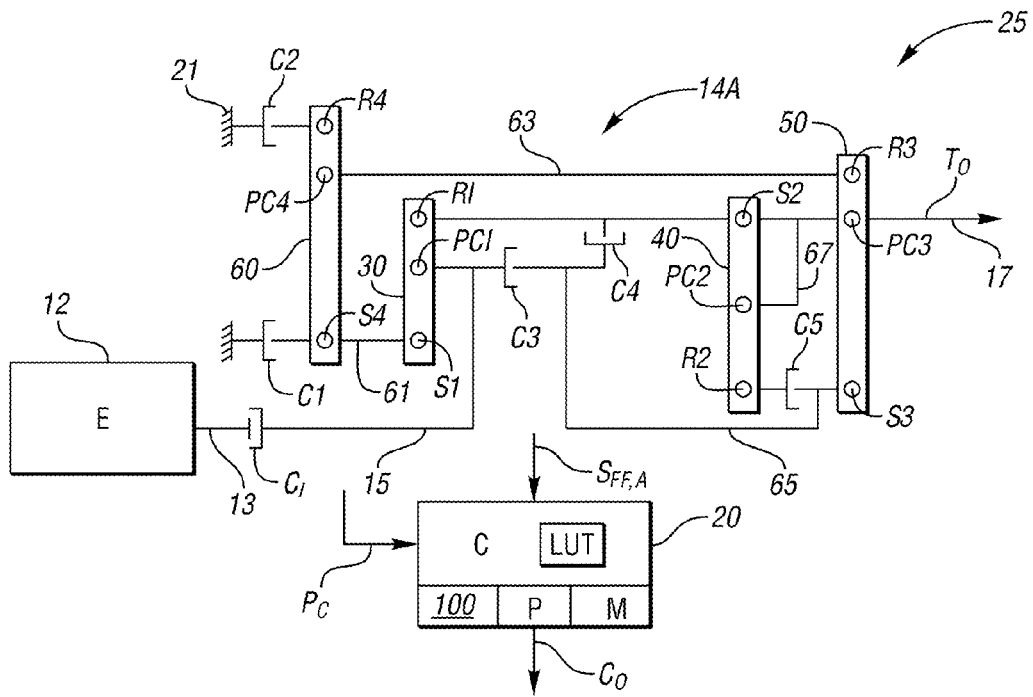
FIG. 2A is a schematic lever diagram of an example 8-speed automatic transmission embodiment for the vehicle of FIG. 1.
Figures 2B, 3:
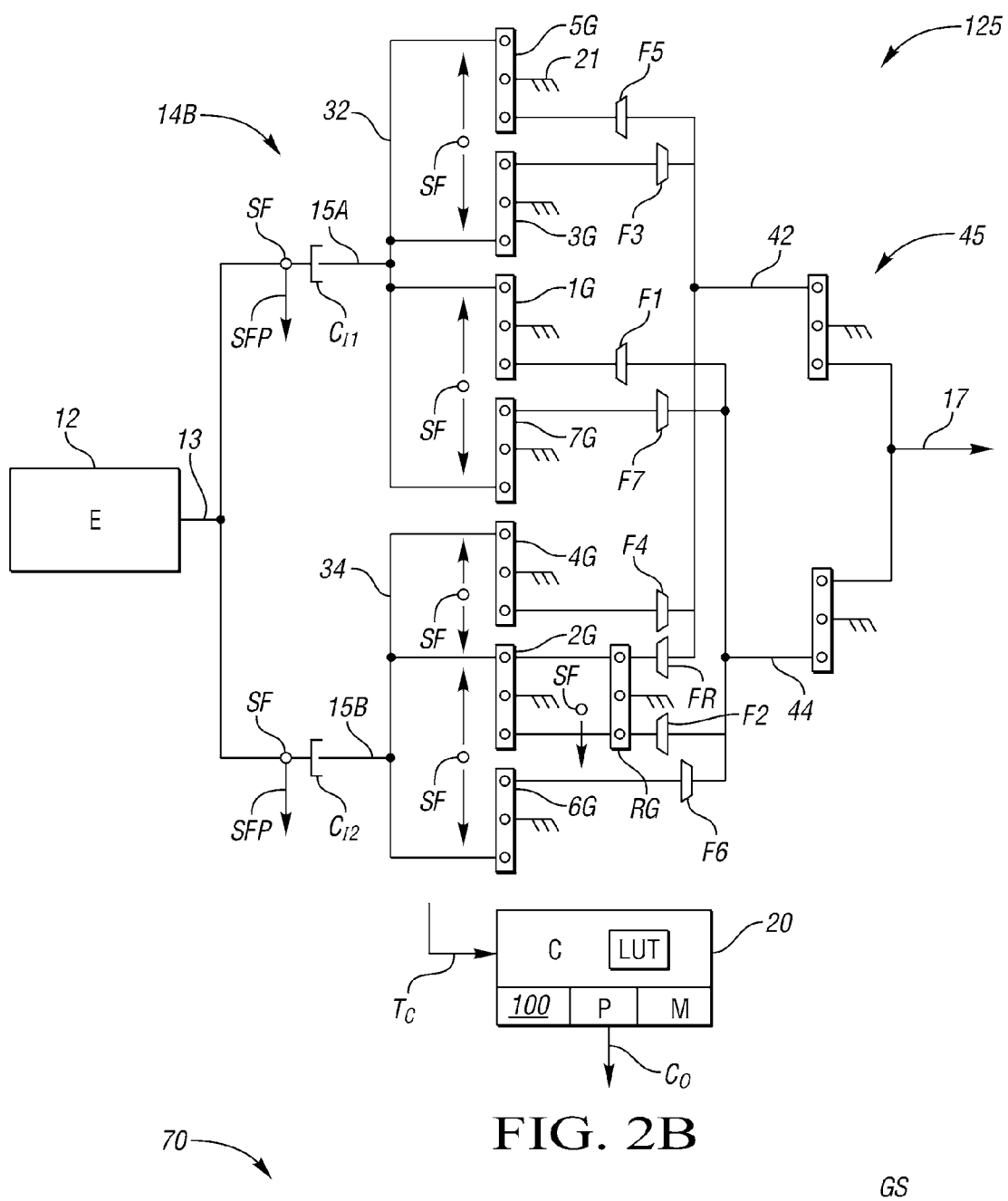
FIG. 2B is a schematic lever diagram of an example dual-clutch transmission (DCT) for the vehicle shown in FIG. 1.
FIG. 3 is an example lookup table that is usable in a transmission tie-up monitoring approach for the example 8-speed automatic transmission shown in FIG. 2A.

The engine 12 includes an output shaft 13 that is coupled to an input member 15 of the transmission 14, e.g., via an input clutch ($C_I$) or a hydrodynamic torque converter in a multi-speed transmission, or via two such input clutches ($C_I$) in a dual-clutch transmission (DCT) configuration, with examples of an automatic transmission and a DCT shown in FIGS. 2A and 2B, respectively. Regardless of the embodiment of the transmission 14, input torque ($T_I$) from the engine 12 passes into the transmission 14, and output torque ($T_O$) is ultimately passed to the drive wheels 18 via an output member 17 of the transmission 14 and a final drive set 16.

The controller 20 communicates with the required elements of the vehicle 10 over a controller area network (CAN) bus 19 or other suitable network as shown. Various data elements are received and processed by the controller 20 in executing the method 100 and/or for maintaining overall shift control over the transmission 14. For instance, the controller 20 may receive engine control values ($CC_E$) and transmission control values ($CC_T$) typical of transmission shift control. The engine control values ($CC_E$) may include throttle level, engine speed, engine torque, crank position, etc. Such values may be used in the overall shift control of the transmission 14. The transmission control values ($CC_T$) may include similar speed and torque positions, sump temperatures, a park, reverse, neutral, drive, low (PRNDL) setting of the transmission 14, which may be known from shift logic or detected via a position of a shift lever (not shown), and the like.

In addition, the transmission control values ($CC_T$) also include specific information usable by the controller 20 in executing the method 100: a gearbox status signal (arrow $S_{GB}$) and clutch control input signals (arrow $CC_I$). The controller 20 generates control output signals (arrow $CC_O$) as a result of the method 100 using at least the gearbox status signal (arrow $S_{GB}$) and the clutch control input signals (arrow $CC_I$). The particular values used for the gearbox status signal (arrow $S_{GB}$) and the clutch control input signals (arrow $CC_I$) varies with the design of the transmission 14. Example designs are therefore provided herein for an 8-speed automatic transmission 14A in FIGS. 2A and 3, and for a DCT 14B in FIGS. 2B, 4A, and 4B.

Still referring to FIG. 1, the controller 20 may be configured as a computer device(s) having tangible, non-transitory memory device (M) on which is recorded instructions encoding the method 100. The controller 20 may include elements as a microprocessor (P), circuitry including but not limited to a timer 22, a high-speed clock, analog-to-digital (A/D) circuitry, digital-to-analog (D/A) circuitry, a digital signal processor, and any necessary input/output (I/O) devices and other signal conditioning and/or buffer circuitry. The memory (M) may include read only memory (ROM), e.g., magnetic and/or optical memory, as well as random access memory (RAM), electrically-erasable programmable read-only memory (EEPROM), and the like. However configured, the controller 20 executes the method 100 from memory (M) using the lookup tables (LUT), with an example of the method 100 shown in FIG. 5 and explained below.

Referring to FIG. 2, the example 8-speed automatic transmission 14A is one possible embodiment of the transmission 14 of FIG. 1. The transmission 14A may include first, second, third, and fourth planetary gear sets 30, 40, 50, and 60. The first planetary gear set 30 may include nodes or gear elements in the form of a sun gear (S1), a planetary carrier (PC1), and a ring gear (R1). The other planetary gear sets 40, 50, and 60 may include similar gear elements as indicated by S2-4, R2-4, and PC2-4. Other automatic transmission designs may be envisioned having more or fewer gearsets, and more or fewer output speeds, without departing from the intended inventive scope.

The transmission 14A further includes a plurality of hydraulic clutches, including the input clutch $C_I$ and respective first, second, third, fourth, and fifth clutches C1-C5. Of the clutches C1-5, the clutches C1 and C2 may be configured as braking clutches, i.e., connectable to a stationary member 21 so as to act like a brake when applied, while the remaining clutches C3-C5 are rotating clutches. The clutches C1-5 may be described in terms of their function within the transmission 14A.

That is, in a particular clutch nomenclature, "C" denotes a clutch, "B" denotes braking, i.e., a clutch connected on one end to a stationary member 21, "1-8" denotes $1^{st}$-$8^{th}$ gear, respectively, and "R" denotes reverse. Inclusion of a particular gear in the nomenclature thus indicates that the particular clutch is engaged during that particular gear state. Using such nomenclature, for example, clutch C1 may be denoted CB1278R to indicate that clutch C1 is a braking clutch, i.e., selectively connected to stationary member 21, and is applied in $1^{st}$, $2^{nd}$, $7^{th}$, and $8^{th}$ gears, as well as in reverse. Clutch C2, which is the other braking clutch in the configuration shown in FIG. 2A, may act as clutch CB12345R in the same embodiment. The rotating clutches C3-5 may act as clutches C13567, C23468, and C45678R, respectively.

Interconnecting members 61, 63, 65, and 67 may be used to continuously interconnect certain of the planetary gear sets 30, 40, 50, and 60. For example, the interconnecting member 61 may connect nodes of the first and fourth planetary gear sets 30 and 60, respectively, for instance by connecting the sun gear S1 to the sun gear S4. Likewise, the third and fourth planetary gear sets 50 and 60 may be connected to each other via the interconnecting member 63, e.g., connecting ring gear R3 to planetary carrier PC4. Interconnecting member 65 connects the output of clutch C5 to the output of clutch C3, while interconnecting member 67 connects the second and third planetary gear sets 40 and 50, such as by connecting planetary carriers PC2 and PC3 as shown. In this particular example embodiment, the output member 17 of the transmission 14A may be connected to the planetary carrier PC3, and the input member 15 may be connected to the input side of clutch C3. Other connections may be envisioned, and therefore the 8-speed embodiment of FIG. 2A is just one possible design.

The controller 20 may receive the gearbox status signal ($S_{GB}$ of FIG. 1) as a set of adapted clutch control values or "clutch adapts", including at least a fill factor ($S_{FF,A}$), and may also receive the clutch control input signals (arrow $CC_I$ of FIG. 1) as a set of clutch pressure signals (arrow $P_C$). As used herein, the term "clutch adapts" refers to any clutch control value that is periodically updated, e.g., once per shift event, and used in the control of a subsequent shift event. Typical clutch adapts may include clutch return spring pressures for the oncoming and offgoing clutches of a shift, the length and height of a commanded fill pulse commanding an inflow of hydraulic fluid into a respective clutch apply chamber of the oncoming and offgoing clutches, etc.

The term "fill factor" as used herein is a value ranging from 0 to 1 and reflecting the relative level of fill of a given clutch, with "1" indicating a fully-filled clutch and "0" representing a fully exhausted clutch. The fill factor may be used to help identify the involved clutches of a given operating mode of the transmission 14A. Use of these values in the tie-up monitoring method 100 is described below with reference to FIGS. 4A and 4B.

Referring to FIG. 2B, the transmission 14A of FIG. 2A may be alternatively embodied as a dual-clutch transmission (DCT) 14B. The DCT 14B includes respective first/odd and second/even input clutches $CI_1$ and $CI_2$, respectively. The first input clutch $CI_1$ connects the engine 12 to an odd gear shaft 15A of the input member 15 shown in FIG. 1, while the second input clutch $CI_2$ connects the engine 12 to an even gear shaft 15B. That is, the input member 15 of FIG. 1 is divided into separate odd and even gear shafts 15A, 15B, as is well known in the art of DCTs.

The DCT 14B also includes multiple gear sets, which are labeled in FIG. 2B as forward gear sets 1G-7G and a reverse gear set RG. Clutch elements F1-F7 and FR, e.g., hydraulically applied clutch plates and/or clutch synchronizers applied via selector arms (not shown), are selectively engaged by the controller 20 in conjunction with engagement of one of the first or second input clutches $CI_1$, $CI_2$ to establish a desired gear ratio of the DCT 14B. Using this type of gear arrangement, the DCT 14B can be rapidly shifted between gears without completely interrupting power flow from the engine 12.

The controller 20 in the DCT embodiment of FIG. 2B may receive the gear box status signal ($S_{GB}$ of FIG. 1) as a set of measured clutch fork positions ($S_{FP}$), i.e., positions of the particular clutch forks used to apply the clutch elements F1-F7 and FR in a DCT such as the DCT 14B, as is known in the art. The controller 20 also receives the clutch control input signals (arrow $CC_I$ of FIG. 1) as a set of torque commands ($T_C$). The clutch fork positions ($S_{FP}$) may be directly measured via a set of fork position sensors ($S_F$), which are positioned with respect to the various clutch elements F1-F7 and FR in communication with the controller 20. Example fork position sensors ($S_F$) may include Hall effect sensors or magneto-elastic sensors in two possible embodiments.

Regardless of the design of the transmission 14 of FIG. 1, the controller 20 is programmed with the lookup tables (LUT) needed for ongoing monitoring of the performance of the transmission 14 for potential tie-up conditions, and to take control action whenever a threshold tie-up condition is detected. The lookup tables (LUT) are then accessed by the processor (P) of the controller 20 and used by the controller 20 to evaluate the level and location of any such tie-up. The use of the lookup tables (LUT) will now be described with reference to FIGS. 3-5.

Referring to FIG. 3, an example lookup table 70 is one possible embodiment of the lookup tables (LUT) shown in FIGS. 1, 2A, and 2B, with the LUT 70 being usable with the example 8-speed transmission 14A of FIG. 2A. The LUT 70 is intended to set up distinct boundaries for allowable clutch torque capacity for a given shift. When executing a clutch-to-clutch shift, for instance, any holding clutches of the 8-speed transmission 14A must remain locked. If an oncoming or offgoing clutch of the clutch-to-clutch shift is at or above a calibrated clutch torque capacity threshold, a tie-up fault may be indicated depending on the severity and duration of the tie-up. Any clutches that are expected to be disengaged or turned off in a given shift maneuver must also not be above a calibrated clutch capacity threshold. The controller 20 thus continuously monitors the affected clutches of a shift for such a tie-up condition.

In FIG. 3, the clutches C1-C5 of FIG. 2A are plotted against the various gear states (GS), i.e., $1^{st}$-$8^{th}$ gears. The values populating the lookup table 70 are associated clutch torque capacity or pressure limits above a calibrated return spring pressure for the particular clutch C1-C5 being considered. The values used in the example lookup table 70 are merely illustrative, and are therefore nominal. In an actual application, such values may be determined offline as calibration values for the specific transmission design the method 100 is being implemented in. In other words, the data populating the lookup table 70 will vary with each transmission 14.

If for a given shift a clutch is not expected to be on, and from the lookup table 70 has a commanded pressure in excess of the limits listed in the lookup table 70, the controller 20 can start the timer 22 shown in FIG. 1. If the timer 22 expires without a change in the commanded state, a tie-up fault diagnostic code may be generated by the controller 20, with the controller 20 then taking any appropriate powertrain control actions as are necessary to protect the transmission 14 from operation in a tied-up condition.

As an example, in the transmission 14A of FIG. 2A C1 may act as clutch CB1278R, which indicates the clutch C1 should be off in $3^{rd}$-$6^{th}$ gears. Therefore, torque capacity limits are assigned for each gear state (GS) and recorded in the lookup table 70. Likewise, clutch C2 may act as clutch CB12345R, and therefore should be off in $6^{th}$-$8^{th}$ gears. The lookup table 70 includes clutch torque capacity limits for these gear states (GS). The controller 20 is therefore programmed to monitor the transmission 14 of FIG. 1 in any embodiment, i.e., receive and process the gearbox status signals ($S_{GB}$) and the clutch control input signals ($CC_I$) in a calibrated control loop, such as every 2-10 ms, and access the lookup tables (LUT) to quickly determine whether a threshold tie-up condition is present that warrants further action.

The lookup table 70 of FIG. 3 can be used for both steady state operation and during shifts, as will be readily appreciated by one having ordinary skill in the art. The only difference is that during a shift, the lookup table 70 may be accessed twice to obtain the values for the present gear state and the destination gear state. For the steady state condition, the lookup table 70 may be accessed once to determine the torque capacity limits for the clutches that are not necessary to hold the present gear state. For example, while operating in $1^{st}$ gear in the example 8-speed transmission 14, clutches C1, C2 and C3 would be on or applied. C4 could begin to be staged, as C4 is the oncoming clutch for a 1-2 upshift, in order to reduce the shift time. This action would occur during a fixed gear state of $1^{st}$ gear before clutch control has set the necessary flags indicating that it is performing the 1-2 shift. Using the lookup table 70, clutch C4 could be staged to a pressure of up to 350 kpa before tie-up is detected.

Figures 4A, 4B, 5:
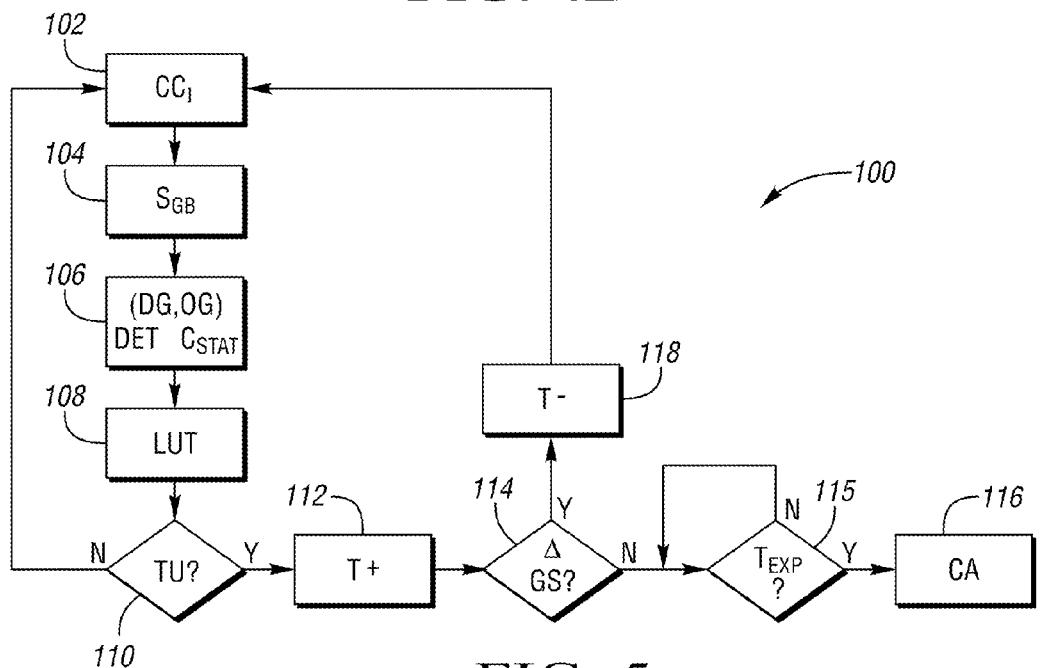
FIG. 4A is an example lookup table for an input clutch that is usable in a transmission tie-up monitoring approach for the example DCT shown in FIG. 2B.
FIG. 4B is an example lookup table for another input clutch of the DCT shown in FIG. 2B.
FIG. 5 is a graphical flow chart describing an example method for monitoring for a potential threshold tie-up condition of the various transmissions shown in FIGS. 1-2B.

FIGS. 4A and 4B depict similar lookup tables 80 and 180 for the DCT 14B of FIG. 2B. As with the lookup table 70 of FIG. 3, the lookup tables 80 and 180 are non-limiting example embodiments of the lookup tables (LUT) shown in FIG. 1. The actual values populating the lookup tables 80 and 180 should be modified to suit the particular transmission with which the method 100 is being used, with the example values shown in the various Figures being nominal and intended solely for illustration of the underlying tie-up monitoring method 100.

Because the shift and established gear state of a DCT is achieved via engagement of one of a pair of input clutches, i.e., input clutches $CI_1$ or $CI_2$, a lookup table maybe assigned for each of the input clutches $CI_1$ and $CI_2$. The lookup table 80 shown in FIG. 4A may be used for states in which the first input clutch $CI_1$ of FIG. 2B is applied, i.e., the oddly-numbered gear states 1G, 3G, 5G, and 7G. The lookup table 180 of FIG. 4B corresponds to states in which the second input clutch $CI_2$ is applied, which occurs during a shift to or ongoing operation in any evenly-numbered gear state 2G, 4G, 6G, and reverse RG. The lookup tables 80 and 180 show the acceptable clutch torque capacity limits, this time as a function of the measured fork states ($F_A$) from the clutch fork positions ($S_{FP}$) shown in FIG. 2B.

Every time the lookup table 80 or 180 is accessed by the controller 20, the lookup table 80 or 180 will return a calibrated acceptable limit based on the fork states indicated by the received clutch fork positions ($S_{FP}$). For example, in FIG. 4B, when a clutch fork F4, i.e., the fork used to achieve $4^{th}$ gear, is measured as being active, the lookup table 180 returns a value of 200 Nm. Otherwise, the lookup table 180 returns a value of 999 Nm, which is an arbitrary value indicating that there is no hazard associated with the fork F4 in the associated gear states. In other words, if the fork required to transmit power is not active, the capacity of the particular clutch tied to that fork has no effect on the normal operation of the DCT 14B, and may be disregarded within the scope of operation of the method 100.

FIG. 5 shows an example of the present method 100 for monitoring for a threshold tie-up condition of the transmission 14 of FIG. 1. The method 100 may be used for any transmission 14, including the transmission 14A of FIG. 2A, the DCT 14B of FIG. 2B, and other designs not disclosed herein. Unless otherwise specified below as one of the transmission 14A or 14B, any reference in the description of FIG. 5 to the transmission 14 of FIG. 1 is intended to encompass both of the transmissions 14A and 14B of FIGS. 2A and 2B.

With reference to the structural elements shown in FIGS. 1, 2A, and 2B, at step 102 the controller 20 receives the clutch control input signals (arrow $CC_I$). Such values are, as noted above, readily available to the controller 20 as part of existing shift control logic. Therefore, the term "receives" as used in this instance refers to any determination by the controller 20 of the requisite values, whether extracted from memory (M) or processed in real time.

In the example 8-speed embodiment shown in FIG. 2A, step 102 may entail determining the clutch pressure ($P_C$) to the various clutches for which a threshold tie-up condition is being monitored. In the DCT embodiment of FIG. 4B, step 102 may entail determining the commanded torque capacity ($T_C$) for the input clutches $CI_1$ and $CI_2$, i.e., the odd and even input clutches. The method 100 proceeds to step 104 once the clutch control input signals (arrow $CC_I$) are determined.

Step 104 entails receiving the gearbox status signals ($S_{GB}$). For the 8-speed embodiment of FIG. 2A, step 104 may include determining the clutch adapts and fill factors as noted above. In such an embodiment, the proxy for torque capacity is a clutch pressure ($P_C$) above a learned or adapted return spring pressure and sufficient stroke, i.e., a fill factor of 1. In the DCT embodiment of FIG. 2B, step 104 may entail determining the clutch and fork states via direct sensing or measurement of the fork positions ($S_{FP}$). The method 100 proceeds to step 106 once the clutch control input signals (arrow $CC_I$) are known.

At step 106, the controller 20 determines clutch status ($C_{STAT}$). The particular manner in which this is done depends on the configuration of the transmission 14. For the example 8-speed transmission 14A of FIG. 2A, the controller 20 may determine the destination gear (DG) and the origin gear (OG) for a requested shift. The destination gear is the gear state the transmission 14 is transitioning into, while the origin gear is the state the transmission is transitioning from. For example, in a 3-4 upshift, the origin gear is $3^{rd}$ gear and the destination gear is $4^{th}$ gear. The controller 20 can determine the number of clutches needed for a tie-up condition based on the origin and destination gears. A clutch that has torque capacity has a fill factor of 1 and is commanded above return spring pressure. While in a fixed gear state of the 8-speed transmission 14A of FIG. 2A, only one additional clutch needs to be applied for a tie-up condition to be present. In a neutral state, more than one clutch is required to be applied for a tie-up to be present. During shifting conditions, i.e., when the destination gear is not the origin gear, the lower of the calibrated limits for each clutch is used to determine whether the threshold tie-up condition is present.

For the DCT embodiment of FIG. 2B, step 106 may include the controller 20 determining the transmission gear state from the sensed fork position. For instance, if the sensed fork position is within a known position window, the controller 20 can consider that fork to be engaged in a given gear and ready to allow shaft synchronization. The method 100 proceeds to step 108 once the clutch status is known.

At step 108, the controller 20 next references the lookup table (LUT) of FIG. 1 to determine the calibrated clutch torque capacity limits for the particular clutches involved in the shift, or involved in a fixed gear or neutral if monitoring occurs during a fixed gear or neutral. FIGS. 3, 4A, and 4B depict example configurations for such lookup tables. The method 100 then proceeds to step 110.

Step 110 entails determining whether a potential threshold tie-up condition of the transmission 14 is present. For instance, the controller 20 may compare the extracted lookup table values from step 108 to actual/measured clutch capacities of the involved clutches in a given shift, e.g., the oncoming and offgoing clutches in a clutch to clutch shift, to determine whether the actual clutch capacities exceed the calibrated limits as contained in the lookup tables (LUT) of FIG. 1. If either of the actual clutch capacities exceeds the allowable limit, the method 100 proceeds to step 112. Otherwise, the method 100 repeats step 102.

Step 112 may entail starting a timer, e.g., the timer 22 of FIG. 1, as indicated by T+ in FIG. 5. A benefit of executing step 112 is to avoid taking unnecessary control actions in response to transient tie-ups that clear themselves after an acceptable delay. For example, in some shift events the overall shift control logic for the transmission 14 may intentionally tie-up the transmission 14, such as by purposefully slipping one of the clutches involved in the shift to achieve a desired shift feel. In such a situation, a true tie-up condition is not actually present. Control actions in such a false positive case would be unnecessary and could affect overall drive quality and enjoyment. The method 100 proceeds to step 114 once the timer 22 has been started.

At step 114, the controller 20 of FIG. 1 next determines whether a change in gear state has been commanded in the interim since commencement of step 102. Step 114 may include processing the gearbox status signals ($S_{GB}$) and the clutch input control signals ($C_I$) to determine which of the clutches of the transmission 14 are to be applied or released in the requested shift. If so, the method 100 proceeds to step 118. Otherwise, the method 100 proceeds to step 115.

Step 115 includes comparing the current value of the timer 22 of FIG. 1 to a calibrated timeout duration, for instance 175-225 ms, to determine if the timer 22 has expired ($T_{EXP}$) relative to the calibrated timeout duration. If the timer 22 has expired, the method 100 proceeds to step 116. Otherwise, the timer 22 continues counting, and step 115 is effectively repeated until the timer 22 times out or a change in gear state is commanded.

Step 116 includes executing a control action in response to a determination from the preceding steps that a predetermined tie-up condition of the transmission 14 has been detected. Various options exist for step 116. For example, a diagnostic code may be recorded in memory (M) of FIG. 1 as part of the transmitting of the control output signals ($CC_O$). Other control actions may include executing a default mode of the transmission 14, for instance by locking the transmission 14 into a default gear state to provide limited drive functionality, thereby enabling a driver to reach a service or repair destination.

The method 100 described above, as executed by the controller 20 of FIGS. 1-2B, effectively provides tie-up monitoring logic that can continuously monitor clutch torque capacities in the background of existing clutch shift control logic. In executing the method 100, the controller 20 takes advantage of existing clutch and shift control parameters such as present gear state, clutch pressure commands, and clutch torque commands, and possibly measured clutch fork positions in a DCT embodiment such as is shown in FIG. 2B, and safeguards against unintended threshold acceleration events that may be noticeable to a driver.

The computationally efficient approach is robust in that it avoids the use of speed sensors that may be sensitive to noise, and the use of cumbersome ratio-based calculations. By monitoring solely for threshold tie-up conditions rather than for all possible tie-ups of the transmission 14, the controller 20 also avoids false positives. While the control actions described above with reference to FIG. 5 should occur rarely if at all, with most tie-ups resolving themselves via shift logic in the usual manner, the method 100 nevertheless provides an additional layer of performance security without interfering with normal shift control of the transmission 14.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
 a prime mover having an output shaft;
 a transmission having an input member that is selectively connectable to the output shaft, an output member, a plurality of gear sets, and a plurality of clutches; and
 a controller in communication with the transmission, wherein the controller includes a processor and is programmed to monitor an operation of the transmission for a threshold tie-up condition, and to execute instructions via the processor to thereby:
  process a set of clutch control input signals and a gearbox status signal to identify, from among the plurality of clutches, a set of clutches that are involved in establishing or maintaining a present operating mode of the transmission;
  determine an actual clutch torque capacity of a predetermined number of the involved clutches;
  compare the determined actual clutch torque capacities to a respective calibrated clutch torque capacity for each of the predetermined number of involved clutches; and
  execute a control action with respect to the transmission in response to the threshold tie-up condition of the transmission, wherein the threshold tie-up condition is present when the determined actual clutch torque capacities exceed the calibrated clutch torque capacity for the predetermined number of the involved clutches for longer than a calibrated duration.

2. The vehicle of claim 1, wherein the transmission is an 8-speed multi-speed automatic transmission, the predetermined number of involved clutches includes an offgoing and an oncoming clutch, the present operating mode is a shift of the transmission, and the clutch control input signals include a commanded clutch pressure for each of the involved clutches.

3. The vehicle of claim 2, wherein the control action includes setting a diagnostic code.

4. The vehicle of claim 3, wherein the control action additionally includes commanding a default operating mode of the transmission.

5. The vehicle of claim 1, wherein the transmission is a dual-clutch transmission (DCT), the DCT having an odd input clutch and an even input clutch, in which the plurality of clutches are actuated via a corresponding clutch fork each having a fork position, wherein the predetermined number of involved clutches includes the odd input clutch and the even input clutch, the gearbox status includes the fork positions of the involved clutches, and the clutch control input signals include a commanded clutch torque for each of the involved clutches.

6. The vehicle of claim 5, wherein the transmission includes a plurality of fork position sensors each operable to measure a respective fork position.

7. The vehicle of claim 6, wherein the plurality of fork position sensors includes a Hall effect sensor.

8. The vehicle of claim 6, wherein the plurality of fork position sensors includes a magnetoelectric sensor.

9. The vehicle of claim 1, wherein the controller is configured to detect a requested shift of the transmission as the present operating mode, the transmission is an 8-speed automatic transmission having four planetary gear sets as the plurality of gear sets, and the controller is configured to identify the involved clutches at least in part by identifying a destination gear and an origin gear of the requested shift.

10. A system comprising:
   a transmission having an input member that is connectable to a prime mover, and also having an output member, a plurality of gear sets, and a plurality of clutches; and
   a controller in communication with the transmission, wherein the controller is programmed to monitor an operation of the transmission for a threshold tie-up condition, and includes a processor that executes instructions via a processor to thereby:
      process a set of clutch control input signals and a gearbox status signal to identify, from among the plurality of clutches, a set of clutches involved in establishing or maintaining a present operating mode of the transmission;
      determine a respective actual clutch torque capacity of a predetermined number of the involved clutches;
      compare the determined clutch torque capacities to a respective calibrated clutch torque capacity for each of the predetermined number of involved clutches; and
      execute a control action with respect to the transmission in response to the threshold tie-up condition of the transmission, including setting a diagnostic code, wherein the threshold tie-up condition is present when the determined clutch torque capacities exceed the calibrated clutch torque capacity for the predetermined number of involved clutches for longer than a calibrated duration.

11. The system of claim 10, wherein the transmission is a multi-speed automatic transmission, the predetermined number of involved clutches include two clutches: an offgoing and an oncoming clutch, the present operating mode is a clutch-to-clutch shift of the transmission, and the clutch control input signals include a commanded clutch pressure for each of the involved clutches.

12. The system of claim 11, wherein the multi-speed automatic transmission is an 8-speed automatic transmission having four planetary gear sets as the plurality of gear sets, and also having, as the plurality of clutches, an input clutch, two braking clutches, and three rotating clutches.

13. The system of claim 11, wherein the control action additionally includes commanding a default operating mode of the transmission.

14. The system of claim 11, wherein the transmission is a dual-clutch transmission (DCT) in which the plurality of clutches includes an odd input clutch operable to select any oddly-numbered gear sets of the DCT and an even input clutch operable to select any evenly-numbered gear sets of the DCT.

15. The system of claim 14, wherein the plurality of clutches are actuated via clutch forks each having a measurable fork position, the transmission further comprising a set of fork position sensors operable for measuring the fork positions of the clutch forks, and wherein the gearbox status signal includes the measured fork positions.

16. The system of claim 15, wherein the fork position sensors are selected from the group consisting essentially of: Hall effect sensors and magnetoelectric sensors.

17. A method of monitoring a transmission for a threshold tie-up condition, the method comprising:
   receiving a set of clutch control input signals and a gearbox status signal;
   identifying, from among a plurality of clutches of the transmission, a set of clutches involved in establishing or maintaining a present operating mode of the transmission;
   determining a current clutch torque capacity of a predetermined number of the involved clutches;
   extracting, via a controller, a calibrated clutch torque capacity from a lookup table for each of the predetermined number of involved clutches;
   comparing the determined clutch torque capacities to the respective calibrated clutch torque capacities for the predetermined number of involved clutches; and
   executing a control action with respect to the transmission in response to a threshold tie-up of the transmission, including recording a diagnostic code and a default operating mode of the transmission via the controller, wherein the threshold tie-up of the transmission is present when the determined clutch torque capacities exceed the calibrated clutch torque capacity for the predetermined number of involved clutches for longer than a calibrated duration.

18. The method of claim 17, wherein the transmission is a multi-speed automatic transmission, and wherein the receiving a set of clutch control input signals and a gearbox status signal includes receiving a clutch pressure, an origin gear, and a destination gear of the transmission.

19. The method of claim 17, wherein the transmission is a dual-clutch transmission (DCT), and wherein the receiving a set of clutch control input signals and a gearbox status signal includes receiving a clutch torque command and a fork position of a respective fork used for actuating the predetermined number of involved clutches.

20. The method of claim 19, further comprising measuring the fork position via one of a Hall effect sensor and a magnetoelastic sensor.

* * * * *